United States Patent
Kim et al.

(10) Patent No.: US 12,541,440 B2
(45) Date of Patent: Feb. 3, 2026

(54) REDUNDANCY AND SWAPPING SCHEME FOR MEMORY REPAIR

(71) Applicant: Micron Technology, Inc., Boise, ID (US)

(72) Inventors: Jaeil Kim, Suwanee, GA (US); Simon J. Lovett, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 11 days.

(21) Appl. No.: 18/403,198

(22) Filed: Jan. 3, 2024

(65) Prior Publication Data

US 2024/0232028 A1    Jul. 11, 2024

Related U.S. Application Data

(60) Provisional application No. 63/437,281, filed on Jan. 5, 2023.

(51) Int. Cl.
| | | |
|---|---|---|
| *G06F 11/16* | (2006.01) | |
| *G06F 3/06* | (2006.01) | |
| *G11C 29/00* | (2006.01) | |
| *G11C 29/44* | (2006.01) | |

(52) U.S. Cl.
CPC ........ *G06F 11/1612* (2013.01); *G06F 3/0619* (2013.01); *G06F 3/0658* (2013.01); *G06F 3/0673* (2013.01); *G11C 29/4401* (2013.01); *G11C 29/76* (2013.01); *G06F 2201/805* (2013.01)

(58) Field of Classification Search
CPC .. G06F 11/1612; G06F 2/0619; G06F 3/0658; G06F 3/0673; G06F 2201/805; G11C 29/808; G11C 29/76; G11C 29/4401
See application file for complete search history.

(56) References Cited

U.S. PATENT DOCUMENTS

| | | | | | |
|---|---|---|---|---|---|
| 4,601,019 | A | * | 7/1986 | Shah .................... | G11C 29/808 |
| | | | | | 365/230.01 |
| 4,829,480 | A | * | 5/1989 | Seo ...................... | G11C 29/808 |
| | | | | | 714/711 |
| 5,394,368 | A | * | 2/1995 | Miyamoto ........... | G11C 29/848 |
| | | | | | 365/225.7 |

(Continued)

OTHER PUBLICATIONS

"Ferroelectric RAM." in: Wikipedia. Sep. 10, 2022 [online]. Retrieved from the Internet <URL: https://en.wikipedia.org/w/index.php?title=Ferroelectric_RAM&oldid=1109460308> (Year: 2022) (Year: 2022).*

*Primary Examiner* — Michael Maskulinski
*Assistant Examiner* — Bryan P Huang
(74) *Attorney, Agent, or Firm* — Schwegman Lundberg & Woessner, P.A.

(57) ABSTRACT

A memory device can include a bank of memory cells. The bank of memory cells can include multiple groups of columns of memory cells. The memory device can include controller circuitry to provide information pertaining to a column repair redundancy swap for repairing a selected group of the plurality of groups at row address strobe (RAS) time. Upon detection of an error condition in at least one group of columns of memory cells, the controller circuitry can implement the column repair redundancy swap on the corresponding group.

22 Claims, 7 Drawing Sheets

(56) References Cited

U.S. PATENT DOCUMENTS

| | | | | |
|---|---|---|---|---|
| 5,991,211 A | * | 11/1999 | Kato | ................ G11C 29/80 365/225.7 |
| 2002/0093860 A1 | * | 7/2002 | Kato | ................ G11C 29/787 365/200 |

* cited by examiner

REDUNDANCY AND SWAPPING SCHEME FOR MEMORY REPAIR

PRIORITY APPLICATION

This application claims the benefit of priority to U.S. Provisional Application Ser. No. 63/437,281, filed Jan. 5, 2023, which is incorporated herein by reference in its entirety.

FIELD OF THE DISCLOSURE

Embodiments of the disclosure relate generally to memory devices. More specifically, embodiments relate to schemes for memory repair.

BACKGROUND

Memory devices for computers or other electronic devices may be categorized as volatile and non-volatile memory. Volatile memory requires power to maintain its data, and includes random-access memory (RAM), dynamic random-access memory (DRAM), Holographic RAM (HRAM), or synchronous dynamic random-access memory (SDRAM), among others. Non-volatile memory can retain stored data when not powered, and includes, without limitation, ferroelectric random access memory (FeRAM) devices, flash memory, read-only memory (ROM), electrically erasable programmable ROM (EEPROM), static RAM (SRAM), erasable programmable ROM (EPROM), resistance variable memory, phase-change memory, three-dimensional cross-point memory, storage class memory, resistive random-access memory (RRAM), and magnetoresistive random-access memory (MRAM), among others. Persistent memory is an architectural property of the system where the data stored in the media is available after system reset or power-cycling. In some examples, non-volatile memory media may be used to build a system with a persistent memory model.

Memory devices may include some faulty memory cells, whether at manufacturing time or through operation of the device. Various techniques have been devised to handle situations in which memory cells have been identified as faulty. For example, memories may include redundant rows or columns of memory cells. If, however, a memory cell is faulty, a redundant memory component may be substituted for one of the non-redundant memory components. There is a general need to improve the speed of such redundant memory operations.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
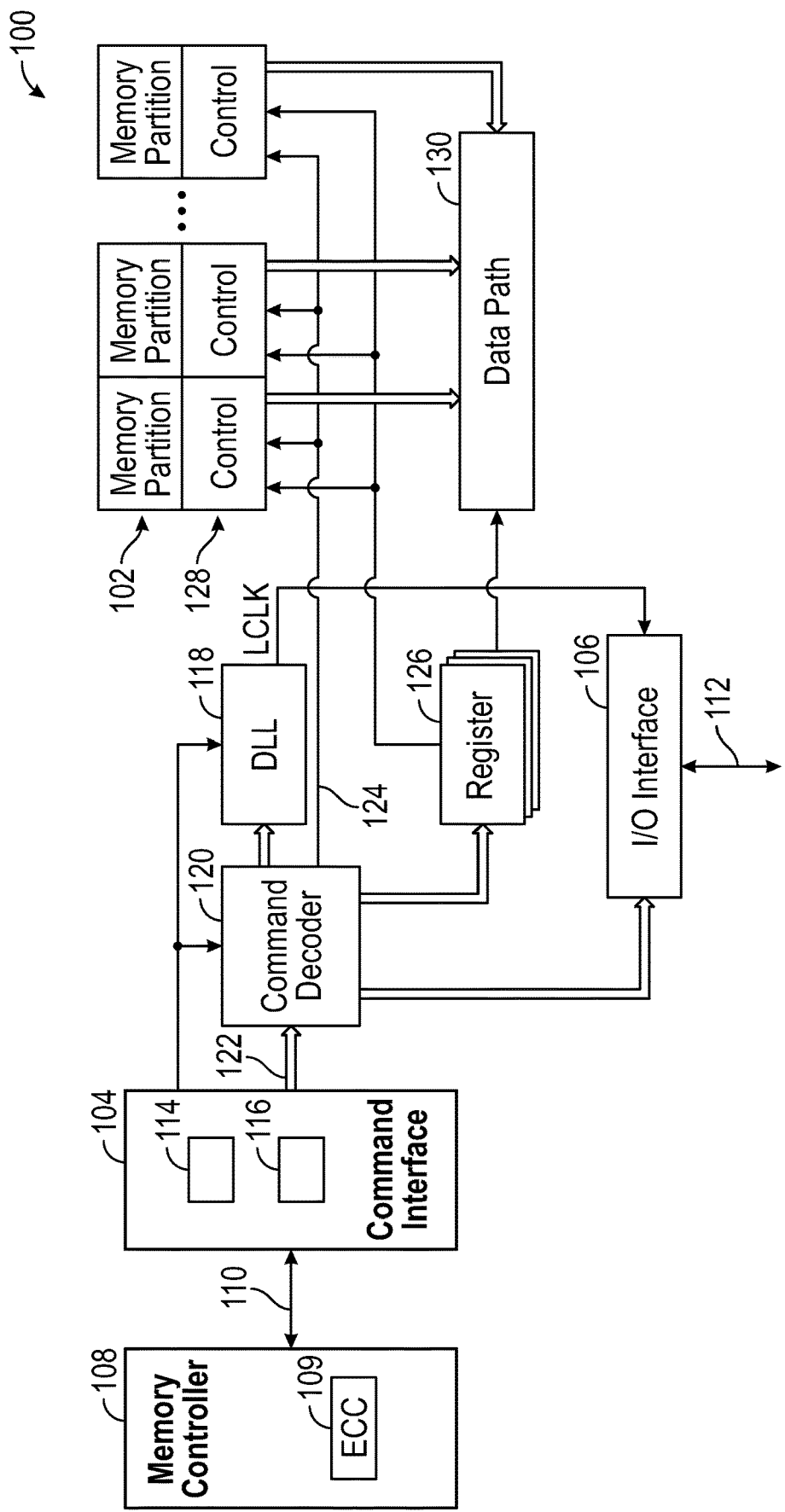
FIG. 1 illustrates an example of a system for operating a memory device in accordance with some examples of the present disclosure.

Memory devices may include some faulty memory cells, and systems and schemes have been devised to identify faulty cells and provide recovery. FIG. 1 illustrates a system in which recovery schemes can be implemented.

FIG. 1 illustrates generally a simplified block diagram of various features of a memory device 100. The block diagram of FIG. 1 can be a functional block diagram illustrating various functions of the memory device 100. In accordance with one embodiment, the memory device 100 may be a random access memory (RAM) device, a dynamic RAM (DRAM) device, a static RAM (SRAM) device (including a double data rate SRAM device), a ferroelectric RAM (FeRAM), holographic RAM (HRAM) flash memory, and/or a phase change memory (PCM) device and/or other chalcogenide-based memory, such as self-selecting memories (SSM). Moreover, the memory cells of the memory device can each have a corresponding logic storing device (e.g., a capacitor, a resistor, or a chalcogenide device).

In some examples, the memory device 100 comprises a ferroelectric RAM (FeRAM), which can utilize two separate operations in the performance of reading or writing functions. These two separate operations can include sensing and programming operations that comprise setting different access lines (e.g., digit lines, plate lines, word lines) to relatively high or low levels, as described with reference to FIG. 1.

In an example, the memory device 100 comprises a cell, or array of cells, arranged according to a planar architecture, with discrete cells or memory elements located at crossings of Word Lines (WL) and Bit Lines (BL). In a two-dimensional array, alternating decks of WL and BL can be provided or layered to provide a 3D memory array.

In some examples, memory cells may store an electrical charge representative of the programmable logic states in a capacitive memory element. For example, a charged and uncharged capacitor of a memory cell may represent two logic states, respectively, or a positively charged and a negatively charged capacitor of a memory cell may represent two logic states, respectively. In some examples, such as FeRAM architectures, a memory cell may include a ferroelectric capacitor having a ferroelectric material as an insulating layer between terminals of the capacitor. Different levels of polarization of a ferroelectric capacitor may represent different logic states (e.g., supporting two or more logic states in a respective memory cell). Ferroelectric materials have non-linear polarization properties.

The memory device 100 can include memory partitions 102, and each memory partition 102 can include one or more cell arrays (i.e., memory arrays). Various configurations, organizations, and sizes of a memory partition 102 on the memory device 100 can be used depending on the application and design of the overall system. For example, each of the memory partitions 102 can comprise a respective different die in a stacked memory device. In such a device, at least one die can be a primary die that interfaces with a host, or a memory controller 108, using an inter-device bus 110, and one or more other dies can be secondary dies that interface with the primary die using an intra-package bus 124. Arrays can also be sub-divided into multiple separately-addressable portions (e.g., into multiple channels, banks, ranks, etc.). Alternatively, a memory system can include multiple memory devices such as the memory device 100 of FIG. 1, where each memory device represents a separately-addressable sub-division (e.g., rank, etc.) of the memory capacity of the system. Accordingly, a memory device or a memory system with multiple memory devices, ranks, channels, banks or the like can include multiple terminals (e.g., clock terminals, CMD/ADD terminals, I/O terminals, etc.) that are dedicated to one or more, but less than all of, the separately-addressable portions. For example, a multi-channel memory device can include multiple terminals, each corresponding to one of the multiple channels of memory.

The memory device 100 can include a command interface 104 and an input/output interface 106. The command interface 104 can receive various signals from an external host device, such as a processor or controller (e.g., a memory controller 108) external to the memory device 100. In some embodiments, an inter-device bus 110 (or a signal path or a group of signal paths) can, individually or in combination, allow for bidirectional transmission of signals between the command interface 104 and the processor or controller (e.g., the memory controller 108).

In an example, the memory device 100 can include a second bus 112 (or a signal path or another group of signal paths) that can, individually or in combination, allow for bidirectional transmission of signals, including, for example, data signals, between the input/output interface 106 and, for example, the processor or controller (e.g., the memory controller 108). Thus, the processor or controller, for example, the memory controller 108, can provide various signals to the memory device 100 to facilitate transmission and receipt of data to be written to or read from the memory device 100.

In an example, the command interface 104 can include or use a number of circuits, such as a clock input circuit 114 and a command/address input circuit 116, to ensure proper handling of the received signals. The command interface 104 can receive one or more clock signals from an external device, such as the memory controller 108. The command interface 104 can receive commands (e.g., read command, write command, etc.), that can be entered on, e.g., positive edges of the clock signal, and can receive data, such as can be transmitted or received on positive and/or negative edges of the clock signal. In some examples, the commands can have a variable clock length (e.g., one or more clocks can be used to receive the commands).

The clock input circuit 114 can receive the one or more clock signals and generate an internal clock signal CLK therefrom. In some embodiments, the internal clock signal CLK is supplied to an internal clock generator 118, such as a delay locked loop (DLL) circuit. The internal clock generator 118 generates a phase-controlled internal clock signal LCLK based on the received internal clock signal CLK. The phase controlled internal clock signal LCLK can be provided to the input/output interface 106, for instance, and can be used as a timing signal for determining an output timing of read data.

The internal clock signal CLK can be provided to various other components within the memory device 100 and can be used to generate various additional internal clock signals. For instance, the internal clock signal CLK can be provided to a command decoder 120. The command decoder 120 can receive command signals from the command bus 122 and can decode the command signals to provide various internal commands. For example, the command decoder 120 can provide command signals to the internal clock generator 118 using an internal bus to coordinate generation of the phase-controlled, internal clock signal LCLK. In some examples, the phase-controlled, internal clock signal LCLK can be used to clock data through the input/output interface 106. In an example, a frequency of the internal clock signal CLK can be less than a frequency of a clock signal used by the memory controller 108 to communicate via the inter-device bus 110.

In an example, the command decoder 120 can decode commands, such as read commands, write commands, register set commands, activate commands, etc., and provide access to a particular one of the memory partitions 102 corresponding to the command, such as via an intra-package bus 124. The command decoder 120 can transmit various signals to one or more registers 126 via a bus path (e.g., one or more global wiring lines). In an example, the memory device 100 can include various other decoders, such as row decoders and column decoders, to facilitate access to the various memory partitions 102. In one embodiment, each memory partition 102 can include a respective control block 128 that provides decoding (e.g., row and/or column decoding), as well as other features, such as timing control and data control, to facilitate the execution of commands to and from the respective memory partition 102.

In an example, the command decoder 120 or other component in the memory device 100 can provide register commands to the one or more of the registers 126, which can be used in operations of each of the memory partitions 102, each control block 128, and the like. For example, one of the registers 126 can define various modes of programmable operations and/or configurations of the memory device 100. The registers 126 can be included in semiconductor devices to define operations for various types of memory components, such as FeRAM, DRAM, synchronous DRAM, chalcogenide memories (e.g., PCM) or other types of memories. The registers 126 can receive various signals from the command decoder 120 via wiring lines that can include a common data path, a common address path, a common write command signal path, or a common read command signal path. The wiring lines can traverse the memory device 100 and couple to each register 126.

The registers 126 can be accessed or otherwise accessible by the memory controller 108. The registers 126 can be dispersed across the memory device 100 and the registers can represent or contain information such as configuration settings of the memory device 100 and/or specific components therein, status information about the memory device 100 and/or specific components therein, memory device 100 parameters and/or specific parameters for components of the memory device 100, or predetermined patterns that can be written across the memory device (e.g., in one or more of the memory partitions 102). Thus, while the registers 126 are illustrated in FIG. 1, it should be appreciated that additional and/or alternative registers can be located elsewhere in the memory device and can be accessed by the memory controller 108 (i.e., when in operation, the registers are accessed by the memory controller 108). Such accesses by the memory controller 108 can include, for example, reads of the registers (e.g., read accesses) and/or writes to the registers (e.g., write accesses).

In an example, the memory device 100 executes operations, such as read commands and write commands, based on the command/address signals received from an external device, such as a processor and/or by the memory controller 108. In one example, command/address signals are clocked to the command interface 104 using clock signals. The command interface 104 can include a command/address input circuit 116 that is configured to receive and transmit the commands to provide access to the memory partitions 102, through the command decoder 120. The command interface 104 can receive memory select signals that enable the memory device 100 to process commands on the incoming command/address signals. Access to specific memory partitions 102 within the memory device 100 can be encoded in the commands.

The command interface 104 can be configured to receive various other command signals. For example, a reset command can be used to reset the command interface 104, status registers, state machines and the like, during power-up or standby exit, for instance. Various signals to facilitate testing of the memory device 100 may be provided. For instance, test signals can be used to place the memory device 100 into a test mode for connectivity testing. The command interface 104 can be used to provide an alert signal or other alarm signal to the system processor or controller for certain errors that may be detected. In some embodiments, the input/output interface 106 can additionally or alternatively transmit an alert signal, for example, a thermal alert.

Data can be sent to and from the memory device 100 using the command and clocking signals discussed above, for example, by transmitting and receiving data signals through the input/output interface 106. More specifically, the data can be sent to or retrieved from the memory partitions 102 over a data path 130, such as can include multiple bidirectional data buses. Data I/O signals, for example, can be transmitted and received in one or more bidirectional data busses to and from the input/output interface 106. For particular memory devices, such as a DDR5 SDRAM memory device, the I/O signals can be divided into upper and lower bytes; however, such segmentation is generally not used for other memory device types.

As will be appreciated, various other components such as power supply circuits (for receiving external VDD and VSS signals), read/write amplifiers (to amplify signals during read/write operations), temperature sensors (for sensing temperatures of the memory device 100), etc., can be incorporated with the memory device 100. Accordingly, it should be understood that the block diagram of FIG. 1 is only provided to highlight certain functional features of the memory device 100 to aid in the subsequent detailed description.

After manufacture, or during operation the memory device 100, errors may occur in some areas of memory. Because a single bit error may render a memory unusable, devices and methods can be provided to repair memories or areas of memory in which memory cells have been identified as faulty. For example, memories may include redundant rows or columns of memory cells. These redundant components are not used if the memory's non-redundant memory cells contain no manufacturing errors. If, however, a memory cell is faulty, a redundant memory component may be substituted for one of the non-redundant memory components such that the memory component including the faulty memory cell is no longer used.

Figure 2A:
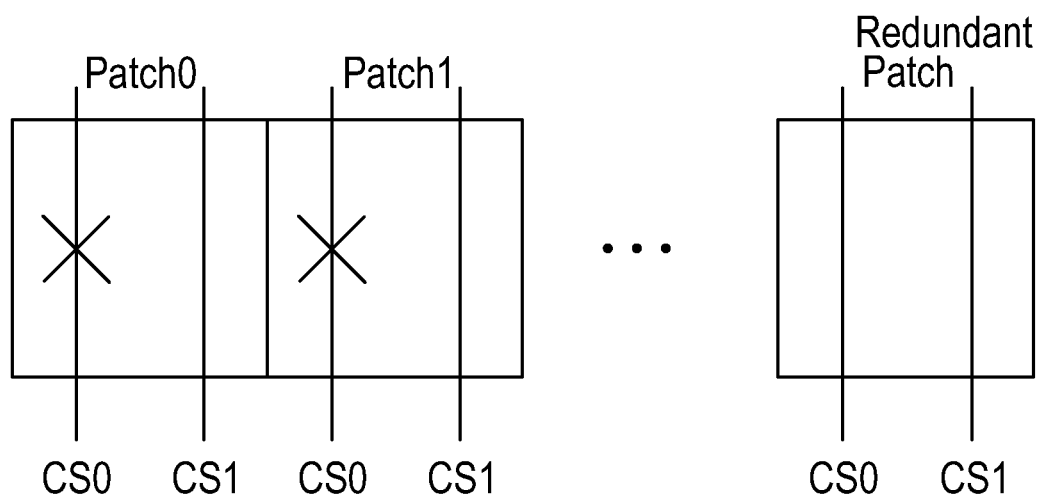
FIG. 2A and FIG. 2B illustrate examples for using a redundancy scheme.
Figure 2B:
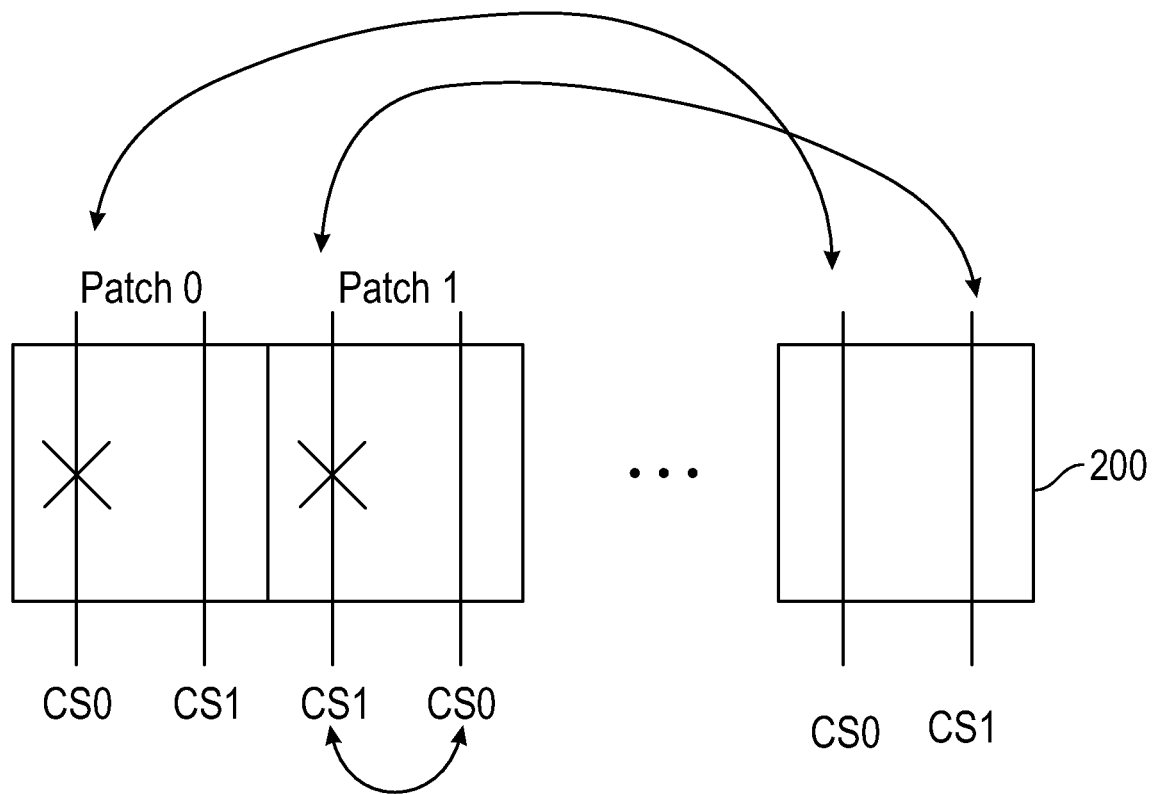

FIG. 2A and FIG. 2B illustrate examples for using a redundancy scheme. When referring to FIG. 2A and FIG. 2B, a group of memory columns (for certain architectures) can be referred to as a patch. In a global column repair scheme, typically, any given column select (CS) can be repaired according to FIG. 2A (e.g., have only one repair as discussed in detail below). Referring to FIG. 2A, if CS0 in Patch 0 is bad (e.g., is defective, as depicted by the x symbol), CS0 can be selected simultaneously in all the patches (e.g., "globally"). However, a global column repair process can only repair one defect using a given CS (e.g., CS0 in the example of FIG. 2A). Accordingly, if there is an error on CS0 in Patch 0, as in the example of FIG. 2A, then a second error (e.g., the error on CS0 in Patch 1) cannot be repaired.

In an example, the scheme illustrated in FIG. 2B can address these concerns. As seen in FIG. 2B, a column address is inverted going to Patch 1 (by swapping with redundant memory 200) such that what was CS0 in Patch 1 is instead CS1. Therefore, in Patch 0, CS0 can be repaired similarly to that shown in FIG. 2A. In Patch 1, CS0 no longer has errors because the errors can be repaired using CS1 according to the global column repair scheme.

Figure 3:
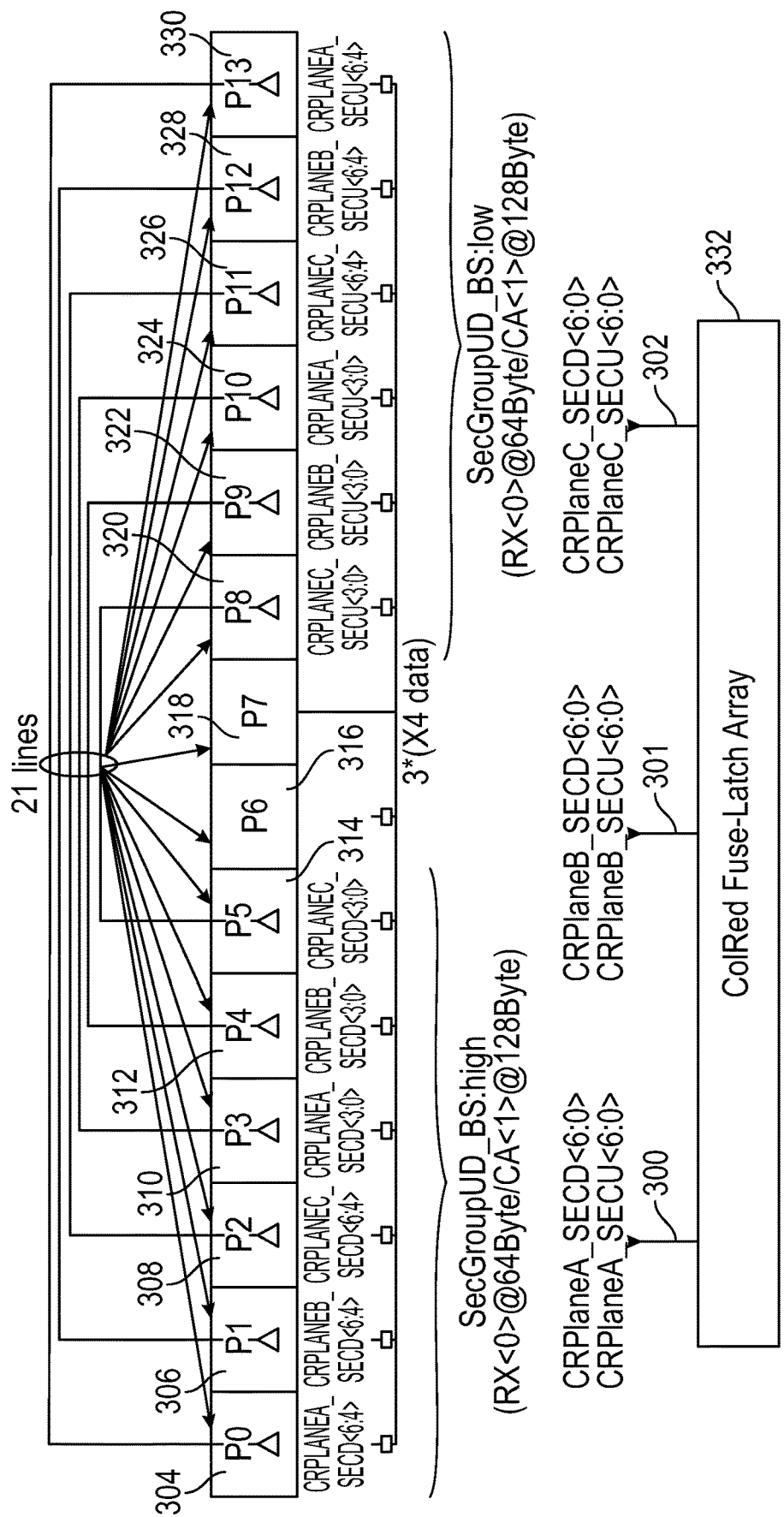
FIG. 3 illustrates column redundancy replacement according to schemes that can be used in available systems.

FIG. 3 illustrates column redundancy replacement according to schemes that can be used in available systems. Column Redundancy (CR) signals 300, 301, 302 can be applied to each patch block 304, 306, 308, 310, 312, 314, 316, 318, 320, 322, 324, 326, 328, 330. In some systems, three CR signals 300, 301, 302 are provided, although some systems can include any number of CR signals. Patch blocks 304, 306, 308, 310, 312, 314, 316, 318, 320, 322, 324, 326, 328, 330 can be understood in the context of embodiments to comprise columns of memory, wherein columns can correspond to respective rows of memory. While fourteen patches are shown in the example of FIG. 3, the example and any embodiments described herein can include any number of patches, which can in turn include any number of columns or rows of memory cells.

CR signals 300, 301, 302 can be decoded according to, for example, a fuse bit table and, if a corresponding location of memory is enabled according to the fuse bit table, a group of data lines of that location is replaced with a corresponding group of data lines of the redundant cell. The group can be any number of data lines and can vary according to specific array architecture. For example, four data lines can be replaced, or any other number of data lines or groups of data lines can be replaced, depending on specific array architecture. The number of fuse bits used to represent locations will vary with the number of groups of data lines being replaced, the number of patches, the number of addresses, etc. The column redundancy fuse-latch array 332 can output fuse bits to allocated lower and upper sense amplifier (SA) addresses. The column redundancy fuse-latch array can also perform multiplexing of the fuse bits.

Providing redundancy signals at or with CR signals 300, 301, 302 can increase time (e.g., the CR signals 300, 301, 302 are in a "time critical path") because of the time needed to match a column redundant unit with a patch block boundary. The column addresses are shifted out to each of the patches so that one CS line can be selected for redundancy replacement, thereby adding to address access time, which is an important latency metric and timing metric for memory systems.

To address these and other concerns, methods and apparatuses according to aspects of the present disclosure provide redundancy signals at row address strobe (RAS) time (rather than at the column address time that follows the row address time) thereby reducing the amount of time to perform redundancy swapping by about an address access time ($t_{AA}$).

Figure 4:
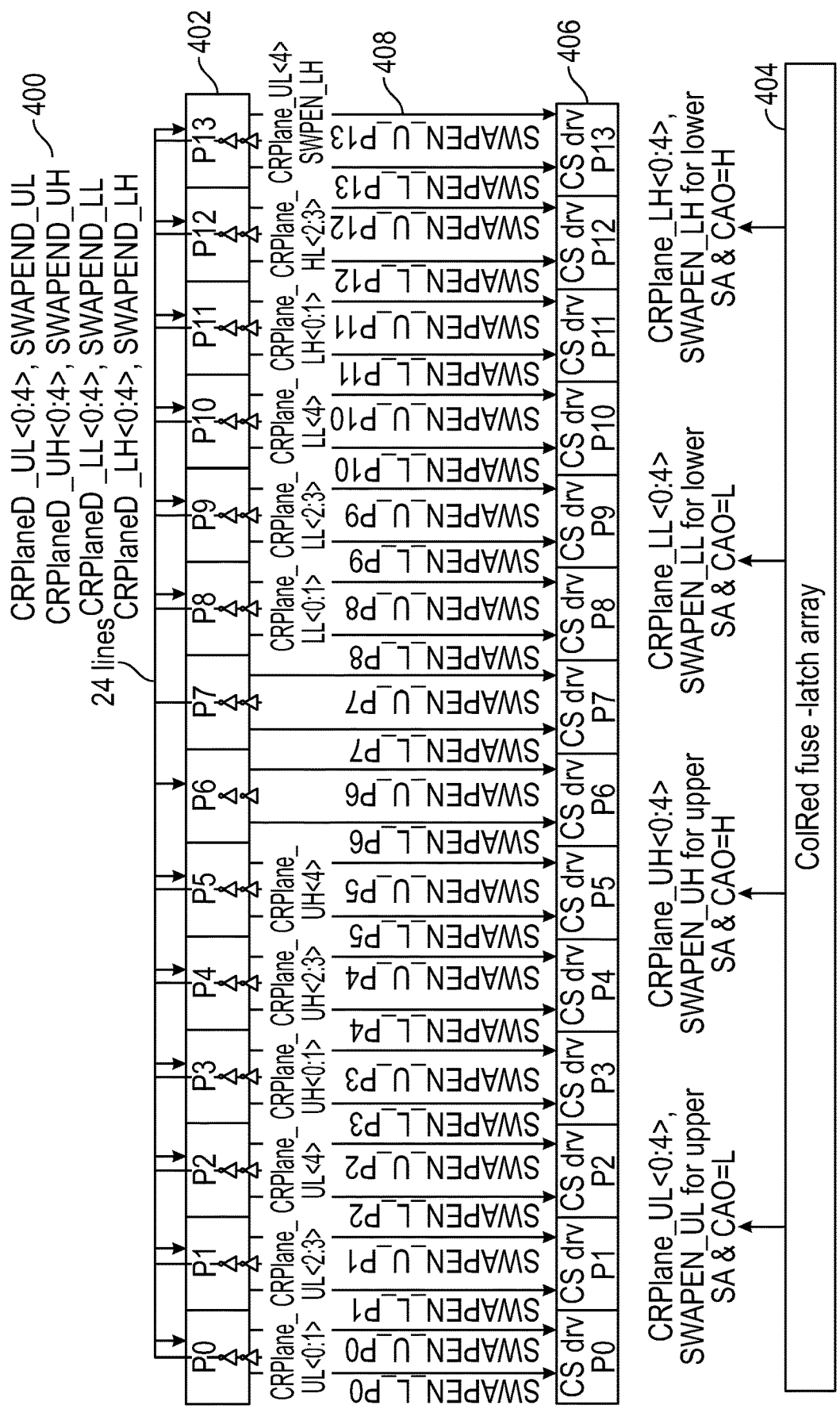
FIG. 4 illustrates column redundancy replacement in accordance with some examples of the present disclosure.

FIG. 4 illustrates column redundancy replacement in accordance with some examples of the present disclosure. Column repair can be arbitrarily segmented per memory section or subsection to meet overall repair capability based on memory cell type, production yields, etc. Memory sections and memory subsections can be decoded as row addresses. Column repair can be performed independently per section or per subsection and accordingly some of the row addresses provided at RAS time can be used to select which group of column repairs are associated with a particular memory array section or subsection. For some memory types, only a limited number of CS lines are provided per page and repair solutions (e.g., redundancy swaps) corresponding to each of this limited number of CS lines are provided at RAS time (as described earlier herein). For example, with reference to FIG. 4, a limited number (e.g., four in the illustrated example) of signals (e.g., CR plane signals 400) are provided corresponding to all four possible repairs. These signals 400 are sent at RAS time, the four groups corresponding to column select 0, 1, 2 and 3 respectively.

Further, in contrast to block 302 described above with reference to FIG. 3, a column redundancy (ColRed) fuse-latch array 404 can output fuse bits to be allocated lower and upper sense addresses (SA) and column addresses (CA) and perform multiplexing based on column and row addresses in each patch block 402. Column select drivers 406 for each patch block then receive signals 408 to perform the swap.

Swap enabling signals (e.g., a signals SWPEN_U/L as shown in FIG. 4) can be generated by the combination of the output signals from the fuse latch array 404 (e.g., CRPlane_UL/UH<4:1>, CRPlane_LL/LH<4:1> and SWPEN_UL/UH and SWPEN_LL/LH as shown in FIG. 4). If a swap is enabled for a column, then a redundancy replacement will occur. In some examples, column redundancy replacement can happen in different sized redundant column groups of data lines similarly to FIG. 3, and the number of fuse bits used will vary depending on the size of these groups. In examples, groups of 11 data bit lines are provided, and in some examples one group of 11 data lines is provided. Embodiments are not limited to any number or size of data line groups.

Systems and methods according to embodiments described with respect to FIG. 4 can reduce $t_{AA}$ because the CR plane signals 400 and SWAPEND are no longer in the speed path, because these signals are provided at Row address (RAS) time in example embodiments rather than Column address (CAS) time. Because the row address is provided before (e.g., about 10-70 nanoseconds before, depending on the memory cell type and architecture) the column address, the column repair section (or subsection) steering can be completed prior to assertion of the column address at CAS time. This removes (e.g., subtracts or lessens) column repair section steering time from the critical address access time latency timing parameter ($t_{AA}$). The column redundancy (CR) signals in embodiments are not performed at the column addressing phase, which are the speed-critical portions of memory access, and accordingly column redundancy signals have no or reduced effect on the speed of memory access.

Figure 5:
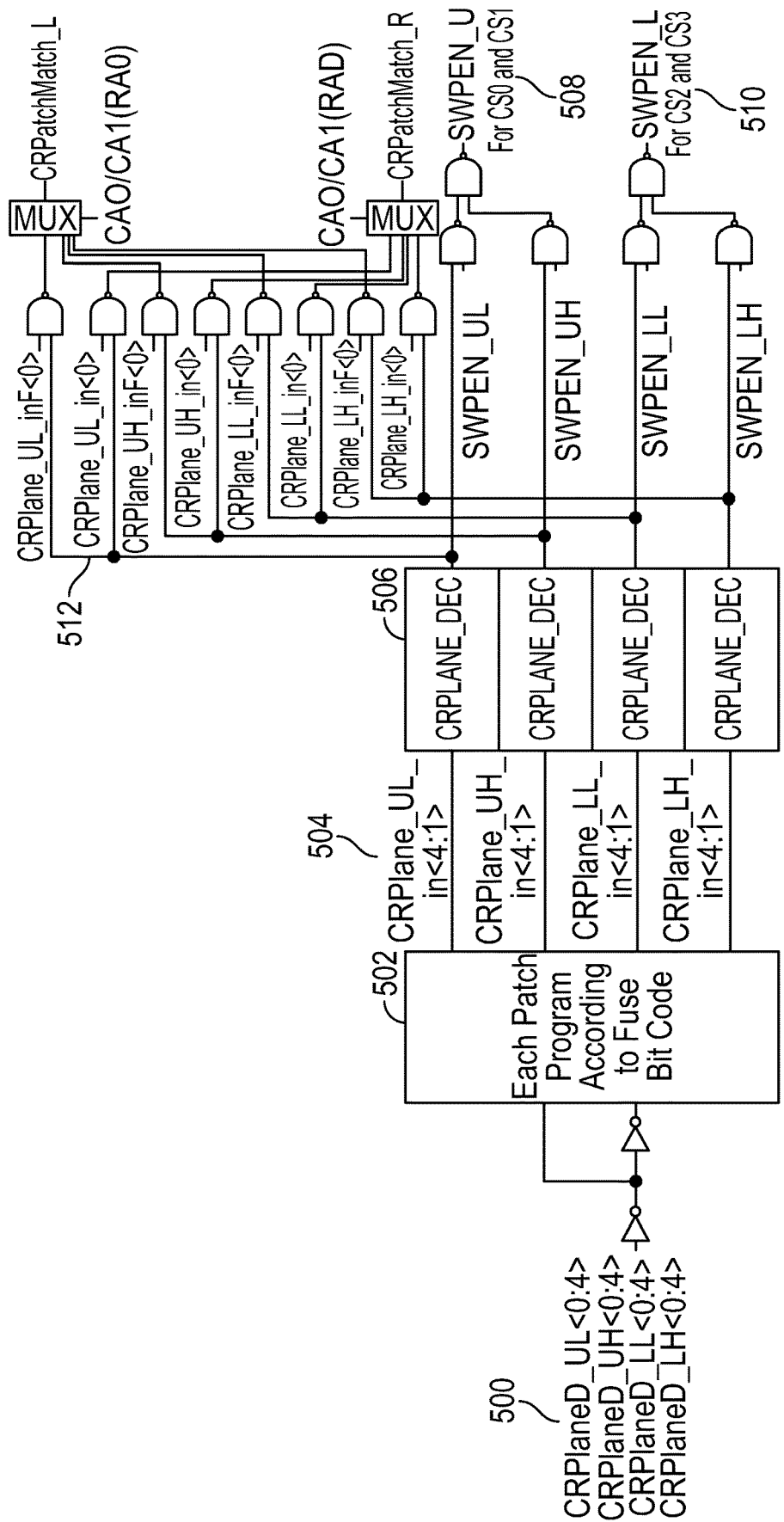
FIG. 5 further illustrates column redundancy replacement in accordance with some examples of the present disclosure.

FIG. 5 illustrates column redundancy replacement in accordance with some examples of the present disclosure. At 500, non-speed critical signals are provided, e.g., at a row selection time when row addresses are presented, similarly to block 400 above. At block 502 each patch (e.g., group of columns) is programmed according to a fuse bit code to indicate a replacement location where a column redundancy placement will occur if and when the relevant fuse is blown indicating an error at that location. At 504, patch selection occurs (similarly to signals 408 in FIG. 4). Circuitry 506 decodes which specific patch (e.g., group of columns) receives the repair. In some embodiments (such as indicated at FIG. 4), fourteen patches can be included, although embodiments are not limited thereto. The number of patches in the architecture may differ depending upon memory cell type, memory density, package configuration and other factors. In combination with signals 508 and 510 for groups of columns (four columns in the illustrated example, although embodiments of the disclosure are not limited thereto), a decision on repair is made.

Each bank can have separate logic to control repair, and repair is unique for each bank. For example, blocks 128 can control repair for each bank of memory.

Figure 6:
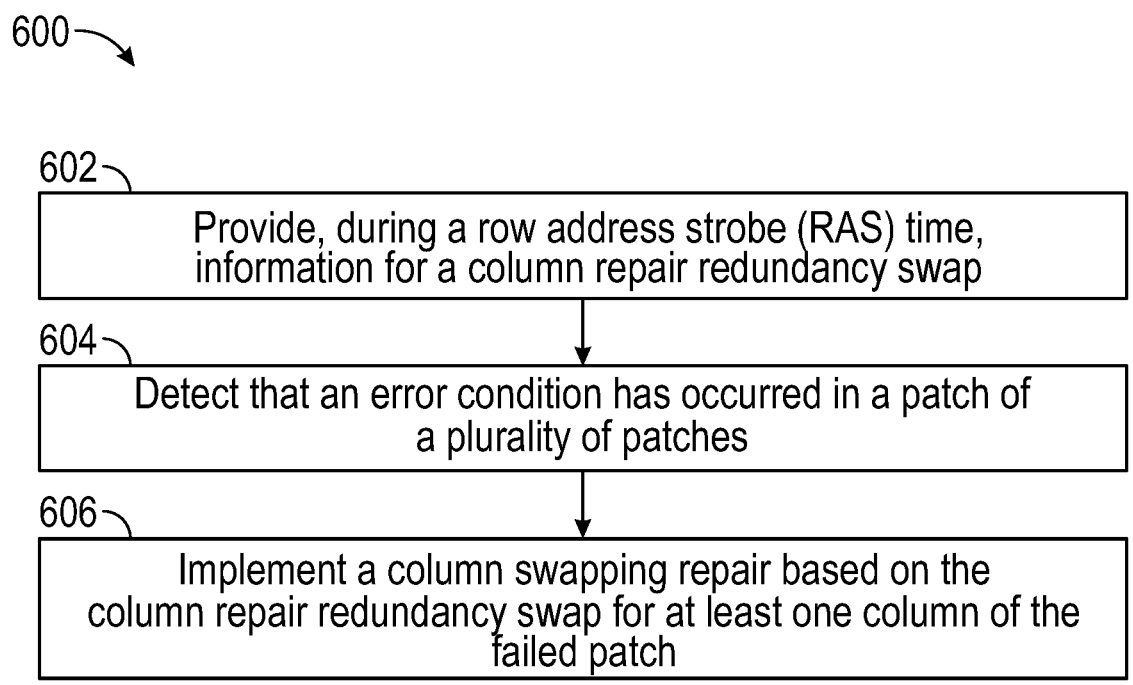
FIG. 6 illustrates a method for accessing memory according to various embodiments.

FIG. 6 illustrates a method 600 for accessing memory according to various embodiments. The method 600 can begin with operation 602 with providing a column repair solution for repairing a selected group of a plurality of groups of columns of memory cells. As described above, the column repair solution can be provided at RAS time, therefore reducing latency in repair schemes. The method 600 can continue with operation 604 with detecting errors in at least one group of columns (e.g., patch) based on, for example, corresponding memory fuses being blown. Responsive to this detecting, in operation 606, a column repair solution can be implemented. As described earlier herein the column repair solution can include swapping failed columns (e.g., a number of data lines for each column) with redundant memory columns. The number of columns, and the number of data lines in each column that can be replaced can vary based on the type of memory. In some examples, groups of 11 data lines can be replaced on each swap, but embodiments are not limited thereto.

Figure 7:
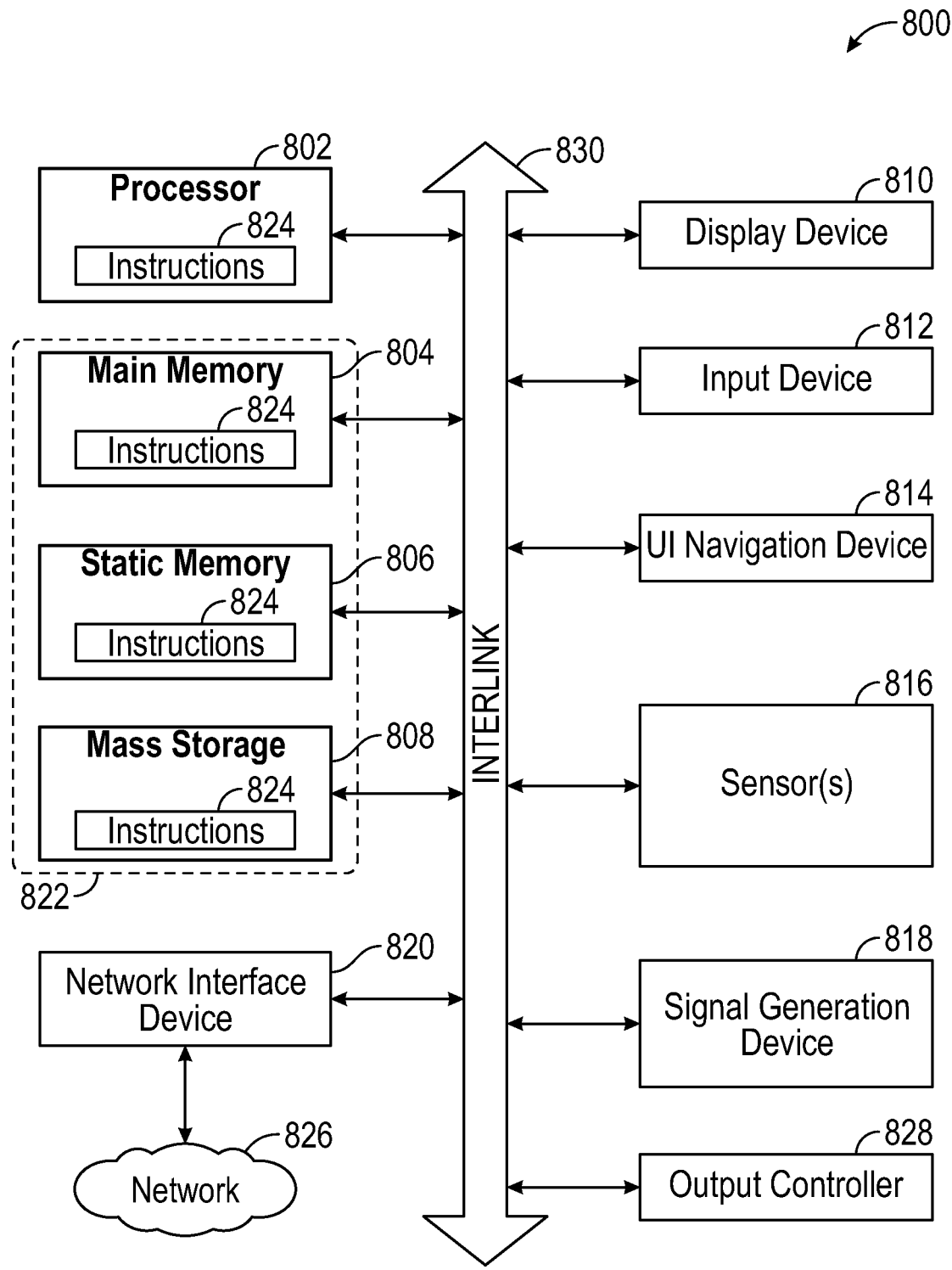
FIG. 7 illustrates a block diagram of an example machine with which, in which, or by which any one or more of the techniques discussed herein can be implemented.

FIG. 7 illustrates a block diagram of an example machine 800 with which, in which, or by which any one or more of the techniques (e.g., methodologies) discussed herein can be implemented. Examples, as described herein, can include, or can operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

In alternative embodiments, the machine 800 can operate as a standalone device or can be connected (e.g., networked) to other machines. In a networked deployment, the machine 800 can operate in the capacity of a server machine, a client machine, or both in server-client network environments. In an example, the machine 800 can act as a peer machine in peer-to-peer (P2P) (or other distributed) network environment. The machine 800 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 800 (e.g., computer system) can include a hardware processor 802 or host device (e.g., the host device, a central processing unit (CPU), a graphics processing unit (GPU), a hardware processor core, or any combination thereof), a main memory 804, a static memory 806 (e.g., memory or storage for firmware, microcode, a basic-input-output (BIOS), unified extensible firmware interface (UEFI), etc.), and mass storage device 808 or memory die stack, hard drives, tape drives, flash storage, or other block devices) some or all of which can communicate with each other via an interlink 830 (e.g., bus). The machine 800 can further include a display device 810, an alphanumeric input device 812 (e.g., a keyboard), and a user interface (UI) Navigation device 814 (e.g., a mouse). In an example, the display device 810, the input device 812, and the UI navigation device 814 can be a touch screen display. The machine 800 can additionally include a mass storage device 808 (e.g., a drive unit), a signal generation device 818 (e.g., a speaker), a network interface device 820, and one or more sensor(s) 816, such as a global positioning system (GPS) sensor, compass, accelerometer, or another sensor. The machine 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 802, the main memory 804, the static memory 806, or the mass storage device 808 can be, or include a machine-readable media 822 on which is stored one or more sets of data structures or instructions 824 (e.g., software) embodying or used by any one or more of the techniques or functions described herein. The instructions 824 can also reside, completely or at least partially, within any of registers of the hardware processor 802, the main memory 804, the static memory 806, or the mass storage device 808 during execution thereof by the machine 800. In an example, one or any combination of the hardware processor 802, the main memory 804, the static memory 806, or the mass storage device 808 can constitute the machine-readable media 822. While the machine-readable media 822 is illustrated as a single medium, the term "machine-readable medium" can include a single medium or multiple media (e.g., a centralized or distributed database, or associated caches and servers) configured to store the one or more instructions 824.

The term "machine readable medium" can include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)), ferroelectric random access memory (FeRAM)) and flash memory devices; magnetic disks, such as internal hard disks and removable disks; magneto-optical disks; and CD-ROM and DVD-ROM disks.

In an example, information stored or otherwise provided on the machine-readable media 822 can be representative of the instructions 824, such as instructions 824 themselves or a format from which the instructions 824 can be derived. This format from which the instructions 824 can be derived can include source code, encoded instructions (e.g., in compressed or encrypted form), packaged instructions (e.g., split into multiple packages), or the like. The information representative of the instructions 824 in the machine-readable media 822 can be processed by processing circuitry into the instructions to implement any of the operations discussed herein. For example, deriving the instructions 824 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 824.

In an example, the derivation of the instructions 824 can include assembly, compilation, or interpretation of the information (e.g., by the processing circuitry) to create the instructions 824 from some intermediate or preprocessed format provided by the machine-readable media 822. The information, when provided in multiple parts, can be combined, unpacked, and modified to create the instructions 824. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 824 can be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 can include one or more physical jacks (e.g., Ethernet, coaxial, or phone jacks) or one or more antennas to connect to the network 826. In an example, the network interface device 820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

To better illustrate the methods and apparatuses described herein, a non-limiting set of Example embodiments are set forth below as numerically identified Examples.

Example 1 includes a memory device comprising: a bank of memory cells, the bank including a plurality of groups of columns of memory cells; and controller circuitry configured to: provide, during a row address strobe (RAS) time, information pertaining to a column repair redundancy swap for repairing a selected group of the plurality of groups; and responsive to detecting that an error condition has occurred in a failed group of the plurality of groups, implement the column repair redundancy swap for at least one column of the failed group.

In Example 2, the subject matter of Example 1 can optionally include wherein the bank of memory cells further includes a plurality of redundant memory cells for replacing memory cells of the bank of memory cells, and wherein the controller circuitry is configured to swap a column based on the column repair redundancy swap to replace at least one column of the failed group with a corresponding column of redundant memory cells.

In Example 3, the subject matter of Example 2 can optionally include wherein the controller circuitry is configured to provide information for a plurality of column repair redundancy swaps at RAS time.

In Example 4, the subject matter of Example 3 can optionally include wherein the number of column repair redundancy swaps provided at RAS time is based on memory type of the memory device.

In Example 5, the subject matter of any of Examples 2-4 can optionally include a column redundancy fuse-latch array configured to allocate fuse bits that, in coordination with swap enabling signals, trigger a column repair solution for an indicated column.

In Example 6, the subject matter of Example 5 can optionally include wherein the fuse bits indicate a location of redundant memory cells to be used for the corresponding column repair redundancy swap.

In Example 7, the subject matter of Example 6 can optionally include wherein the column repair solution is performed for a number of data lines, and wherein the number of data lines is based on the type of memory.

In Example 8, the subject matter of any of Examples 1-7 can optionally include wherein the bank of memory cells comprises dynamic random access memory (DRAM).

In Example 9, the subject matter of any of Examples 1-8 can optionally include wherein the bank of memory cells comprises ferroelectric random access memory (FeRAM).

Example 10 is a method comprising: during a row address strobe (RAS) time, performing a column repair for a selected group of a plurality of groups of columns of memory cells responsive to detecting that an error condition has occurred in a failed group of the plurality of groups.

In Example 11 the subject matter of Example 10 can optionally include wherein performing the column repair comprises implementing a column swapping scheme to replace at least one column of the failed group with redundant memory cells.

In Example 12, the subject matter of Example 11 can optionally include providing information for a plurality of column repair redundancy swaps at RAS time.

In Example 13, the subject matter of Example 12 can optionally include wherein the number of column repair solutions provided at RAS time is based on memory type of a memory device upon which the repair redundancy swap is implemented.

In Example 14, the subject matter of any of Examples 10-13 can optionally include allocating fuse bits that, combined with swap enabling signals, triggers a column repair redundancy swap for an indicated column.

In Example 15, the subject matter of Example 14 can optionally include wherein the fuse bits indicate location of redundant memory cells to be used for the corresponding column repair redundancy swap.

In Example 16, the subject matter of Example 14 can optionally include wherein the column repair redundancy swap is performed for a number of data lines, and wherein the number of data lines is based on the type of memory.

Example 17 is a system comprising a host device; and a memory device coupled to the host device, the memory device comprising: a bank of memory cells, the bank including a plurality of groups of columns of memory cells; and controller circuitry configured to: provide, during a row address strobe (RAS) time, information pertaining to a column repair redundancy swap for repairing a selected group of the plurality of groups; and responsive to detecting that an error condition has occurred in a failed group of the plurality of groups, implement the column repair redundancy swap for at least one column of the failed group.

In Example 18, the subject matter of Example 17 can optionally include wherein the bank of memory cells further includes a plurality of redundant memory cells for replacing memory cells of the bank of memory cells, and wherein the controller circuitry is configured to swap a column based on the column repair redundancy swap to replace at least one column of the failed group with a corresponding column of the redundant memory cells.

In Example 19, the subject matter of Example 18 can optionally include wherein the controller is configured to provide information for a plurality of column repair redundancy swaps at RAS time for repairing a plurality of groups of columns of memory cells.

In Example 20, the subject matter of any of Examples 17-19 can optionally include wherein the memory device further comprises a column redundancy fuse-latch array configured to allocate fuse bits that, in coordination with swap enabling signals, triggers a column repair redundancy swap for an indicated column, wherein the fuse bits indicate location of redundant memory cells to be used for the corresponding column repair redundancy swap.

In Example 21, the subject matter of any of Examples 17-20 can optionally include wherein the memory device includes a dynamic random access memory (DRAM) device.

In Example 22, the subject matter of any of Examples 17-21 can optionally include wherein the memory device includes a ferroelectric random access memory (FeRAM) device.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "an example aspect," "some aspects," "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to and are not intended to imply that the objects so described must be in a given sequence, either temporally, spatially, in ranking, or in any other manner.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting and/or the action of receiving. In one example, the phrase "communicating a signal" may refer to the action of transmitting the signal by a first device and may not necessarily include the action of receiving the signal by a second device. In another example, the phrase "communicating a signal" may refer to the action of receiving the signal by a first device and may not necessarily include the action of transmitting the signal by a second device.

As used herein, the term "circuitry" may, for example, refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, circuitry may include logic, at least partially operable in hardware. In some aspects, the circuitry may be implemented as part of and/or in the form of a radio virtual machine (RVM), for example, as part of a Radio processor (RP) configured to execute code to configured one or more operations and/or functionalities of one or more radio components.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The above detailed description includes references to the accompanying drawings, which form a part of the detailed description. The drawings show, by way of illustration, specific aspects in which the invention can be practiced. These aspects are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive.

For example, the above-described examples (or one or more aspects thereof) may be used in combination with each other. Other aspects can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description, with each claim standing on its own as a separate aspect, and it is contemplated that such aspects can be combined with each other in various combinations or permutations. The scope of the invention should be determined with reference to the appended claims, along with the full scope of equivalents to which such claims are legally entitled.

What is claimed is:

1. A memory device, comprising:
   a bank of memory cells, the bank including a plurality of groups of columns of memory cells; and
   controller circuitry configured to:
   provide, during a row address strobe (RAS) time, information pertaining to a column repair redundancy swap for repairing a selected group of the plurality of groups, the information including a column redundancy signal and swap enabling signals; and
   responsive to detecting that an error condition has occurred in a failed group of the plurality of groups, implement the column repair redundancy swap for at least one column of the failed group.

2. The memory device of claim 1, wherein the bank of memory cells further includes a plurality of redundant memory cells for replacing memory cells of the bank of memory cells, and wherein the controller circuitry is configured to swap a column based on the column repair redundancy swap to replace at least one column of the failed group with a corresponding column of redundant memory cells.

3. The memory device of claim 2, wherein the controller circuitry is configured to provide information for a plurality of column repair redundancy swaps at RAS time.

4. The memory device of claim 3, wherein a number of column repair redundancy swaps provided at RAS time is based on memory type of the memory device.

5. The memory device of claim 2, further comprising a column redundancy fuse-latch array configured to allocate fuse bits that, in coordination with the swap enabling signals, trigger a column repair solution for an indicated column.

6. The memory device of claim 5, wherein the fuse bits indicate a location of redundant memory cells to be used for the corresponding column repair redundancy swap.

7. The memory device of claim 6, wherein the column repair solution is performed for a number of data lines, and wherein the number of data lines is based on a type of memory associated with the memory device.

8. The memory device of claim 1, wherein the bank of memory cells comprises dynamic random access memory (DRAM).

9. The memory device of claim 1, wherein the bank of memory cells comprises ferroelectric random access memory (FeRAM).

10. A method comprising:
    providing, during a row address strobe (RAS) time, a column redundancy signal and swap enabling signals; and
    during the RAS time, performing a column repair for a selected group of a plurality of groups of columns of memory cells based on the column redundancy signal and the swap enabling signals and responsive to detecting that an error condition has occurred in a failed group of the plurality of groups.

11. The method of claim 10, wherein performing the column repair comprises implementing a column swapping scheme to replace at least one column of the failed group with redundant memory cells.

12. The method of claim 11, further comprising providing information for a plurality of column repair redundancy swaps at RAS time.

13. The method of claim 12, wherein a number of column repair solutions provided at RAS time is based on memory type of a memory device upon which the repair redundancy swap is implemented.

14. The method of claim 10, further comprising allocating fuse bits that, combined with the swap enabling signals, triggers a column repair redundancy swap for an indicated column.

15. The method of claim 14, wherein the fuse bits indicate location of redundant memory cells to be used for a corresponding column repair redundancy swap.

16. The method of claim 14, wherein the column repair redundancy swap is performed for a number of data lines, and wherein the number of data lines is based on a type of memory associated with the memory device.

17. A system comprising:
    a host device; and
    a memory device coupled to the host device, the memory device comprising:
    a bank of memory cells, the bank including a plurality of groups of columns of memory cells; and
    controller circuitry configured to:
    provide, during a row address strobe (RAS) time, information pertaining to a column repair redundancy swap for repairing a selected group of the plurality of groups, the information including a column redundancy signal and swap enabling signals; and
    responsive to detecting that an error condition has occurred in a failed group of the plurality of groups, implement the column repair redundancy swap for at least one column of the failed group.

18. The system of claim 17, wherein the bank of memory cells further includes a plurality of redundant memory cells for replacing memory cells of the bank of memory cells, and wherein the controller circuitry is configured to swap a column based on the column repair redundancy swap to replace at least one column of the failed group with a corresponding column of the redundant memory cells.

19. The system of claim 18, wherein the controller is configured to provide information for a plurality of column repair redundancy swaps at RAS time for repairing a plurality of groups of columns of memory cells.

20. The system of claim 17, wherein the memory device further comprises a column redundancy fuse-latch array configured to allocate fuse bits that, in coordination with the swap enabling signals, triggers a column repair redundancy swap for an indicated column, wherein the fuse bits indicate location of redundant memory cells to be used for a corresponding column repair redundancy swap.

21. The system of claim 17, wherein the memory device includes a dynamic random access memory (DRAM) device.

22. The system of claim 17, wherein the memory device includes a ferroelectric random access memory (FeRAM) device.

* * * * *